(12) United States Patent
Bennett et al.

(10) Patent No.: US 7,640,538 B2
(45) Date of Patent: Dec. 29, 2009

(54) VIRTUAL THREADS IN BUSINESS PROCESS PROGRAMS

(75) Inventors: Jonathan D. Bennett, Markham (CA); William G. O'Farrell, Markham (CA)

(73) Assignee: International Business Machines Corporation, Armonk, NY (US)

(*) Notice: Subject to any disclaimer, the term of this patent is extended or adjusted under 35 U.S.C. 154(b) by 631 days.

(21) Appl. No.: 11/099,313

(22) Filed: Apr. 5, 2005

(65) Prior Publication Data

US 2006/0225042 A1    Oct. 5, 2006

(51) Int. Cl.
*G06F 9/44* (2006.01)
(52) U.S. Cl. .................... 717/129; 717/132; 717/114
(58) Field of Classification Search ................ 717/124, 717/129, 132; 705/26; 714/38; 395/183.14
See application file for complete search history.

(56) References Cited

U.S. PATENT DOCUMENTS

| | | | | |
|---|---|---|---|---|
| 5,734,837 | A | | 3/1998 | Flores et al. ................ 395/207 |
| 5,799,297 | A | | 8/1998 | Goodridge et al. ............ 707/1 |
| 5,815,653 | A | * | 9/1998 | You et al. ..................... 714/38 |
| 5,852,449 | A | | 12/1998 | Esslinger et al. ............ 345/473 |
| 6,189,116 | B1 | * | 2/2001 | Mongan et al. ............... 714/38 |
| 6,279,009 | B1 | | 8/2001 | Smirnov et al. ............. 707/103 |
| 6,412,106 | B1 | | 6/2002 | Leask et al. ................. 717/124 |
| 6,668,370 | B1 | | 12/2003 | Harmon et al. ............. 717/125 |
| 2002/0120919 | A1 | | 8/2002 | Aizenbud-Reshef et al. 717/127 |
| 2003/0079159 | A1 | | 4/2003 | Ten-Hove et al. ............. 714/34 |
| 2004/0168155 | A1 | | 8/2004 | O'Farrell et al. ............ 717/129 |
| 2005/0071243 | A1 | * | 3/2005 | Somasekaran et al. ........ 705/26 |

OTHER PUBLICATIONS

Gordhamer, S. et al. "Graphical Dynamic Data Breakpoints", IBM Technical Disclosure Bulletin. vol. 36, No. 09B, Sep. 1993.

* cited by examiner

*Primary Examiner*—Tuan Q Dam
*Assistant Examiner*—Hanh T Bui
(74) *Attorney, Agent, or Firm*—Robert Straight, Esq.; Steven M. Greenberg, Esq.; Carey, Rodriquez, Greenberg & Paul, LLP

(57) ABSTRACT

A method, system and apparatus for applying virtual threads in debugging a business process program. In accordance with the present invention, different activities in a business process can be associated with corresponding virtual thread identifiers where groups of the activities related to one another through corresponding links can be assigned a single virtual thread identifier. Based upon the association of activities with corresponding virtual thread identifiers, a directed graph of different activities of different virtual thread identifiers can be generated. Accordingly, debug operations including applying breakpoints, step over debugging and the like can be applied to a business process program regardless of the host platform for any one activity in the business process program.

6 Claims, 3 Drawing Sheets

VIRTUAL THREADS IN BUSINESS PROCESS PROGRAMS

BACKGROUND OF THE INVENTION

1. Statement of the Technical Field

The present invention relates to the field of business process programming and more particularly to the debugging of a business process program.

2. Description of the Related Art

The business process program paradigm represents a revolutionary approach to wide-scale, distributed data processing. Business process programs utilize a loosely coupled integration model to allow flexible integration of heterogeneous systems in a variety of domains including business-to-consumer, business-to-business and enterprise application integration. Through the use of a messaging protocol, a common grammar for describing business process logic and an infrastructure for publishing and discovering services in a systematic way, business processes can "find" each other and can interact with one another following a loosely coupled, platform-independent model.

Presently, the interaction model of the business process program can be viewed as a stateless model of synchronous or uncorrelated asynchronous interactions. Models for business interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. Rather, the full potential of the business process program paradigm as an integration platform can be achieved only when applications and business processes are able to integrate their complex interactions by using a standard process integration model.

Workflow languages fulfill many if not all of the aspects of a standard process integration model. In this regard, typical workflow language specifications define a technology for integrating cross-enterprise business processes. By coordinating stateful interactions of loosely coupled services across enterprise boundaries, the workflow language can provide a means of modeling the interactions between an enterprise and its business partners, suppliers and customers and thus the value chain of the enterprise. Most importantly, a workflow language can define a notation for specifying business process behavior for use in a business process program.

Workflow languages differ from older, more traditional procedural programming languages in that workflow languages concentrate on allowing the applications developer to specify the interactions between existing processing logic in a business process program rather than requiring the developer to design a business process program and its accompanying processing logic from scratch. As a result, in the workflow paradigm, execution environments partition the program instructions into a number of disjoint tasks, often referred to as activities, which can be coupled together through a description of dependencies between the activities, often referred to as links.

Generally, an activity can include program logic which can invoked by a process engine. For example, the program logic can be a locally or remotely invokable program object which can be activated by the process engine. The process engine can determine a sequence for invoking program logic based upon the links specified for different program objects. Consequently, a business process program can be conceptually viewed as a grouping of activities and links which are executed in run-time environment. Notably, unlike conventional procedural program logic, the processing logic or program objects of a business process program need not be invoked in the exact order specified by the developer. Rather, the process engine can remain free to execute program objects in any order so long as the constraints of the relationship links are satisfied.

The clear distinction between the procedural programming paradigm and the workflow programming paradigm can lead to difficulties in performing common debugging tasks known in the procedural programming paradigm. In the conventional, procedural paradigm, the developer can step through the instructions of an application according to the ordered instructions produced by the compiler. Even where threading adds a layer of complexity to the compiled application, the individual threads of execution can be reduced to a series of time sequenced instructions which can be filed through "stepping over" and "tracing into" operations.

In contrast, the notion of a thread of execution has not been applied to the workflow paradigm. In fact, to the extent that the workflow paradigm implicates multiple independently acting business processes executing across different execution environments, the element of time slicing modeled by threads simply does not exist. In the prototypical business process program, a process portion of the program can be passed to the processing engine as an activity. Selected activities can be handled for execution through the operation of a message queue which may or may not take selected activities in the prescribed order. Different activities can be executed in different environments having different capacities and execution capabilities. Consequently, different chunks of work can be performed concurrently in an unpredictable order.

SUMMARY OF THE INVENTION

The present invention addresses the deficiencies of the art in respect to debugging business process programs and provides a novel and non-obvious method, system and apparatus for applying virtual threads in debugging a business process program. In a method of the invention, for each group of activities in the business process program which are related to each other by way of a link, a unique virtual thread identifier can be assigned to the group. Utilizing each assigned unique virtual thread identifier, debugging operations can be performed on the business process program.

Notably, each activity and link can be specified in a workflow language common grammar. Moreover, the assigning step can be performed synchronously in a business process engine. Finally, to facilitate the performance of debugging operations, a directed graph of the business process program can be generated based upon different activities linked to selected other activities by way of links. Moreover, each assigned unique virtual thread identifier can be utilized to merge virtual threads in the directed graph.

A system for debugging a business process program can include a debug runtime configured for coupling to a business process engine and a debug tool communicatively coupled to the debug runtime. The debug runtime can include logic for managing a directed graph of nodes representing activities related to one another by different links specified by the business process program. Moreover, the debug tool can include logic for performing debug operations selected from the group consisting of establishing and enforcing breakpoints, step over debugging and converting actual breakpoints to flow breakpoints in a mixed stack frame. The execution environment for the business process program can be a message driven environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for applying virtual threads in debugging a business process program. In accordance with the present invention, different activities in a business process can be associated with corresponding virtual thread identifiers where groups of the activities related to one another through corresponding links can be assigned a single virtual thread identifier. In this regard, the virtual thread identifier can identify a virtual thread. A virtual thread can refer to a connected sequence of continuations which have a definable state when suspended.

Thus, a sequence of activities related to one another along a definable flow can be associated with a single virtual thread. As a virtual thread reaches activities which generate concurrency, the concurrency can be represented through the spawning of a new virtual thread. In any event, based upon the association of activities with corresponding virtual thread identifiers, a directed graph of different activities of different virtual thread identifiers can be generated. Accordingly, debug operations including applying breakpoints, step over debugging and the like can be applied to a business process program regardless of the host platform for any one activity in the business process program.

Figure 1:
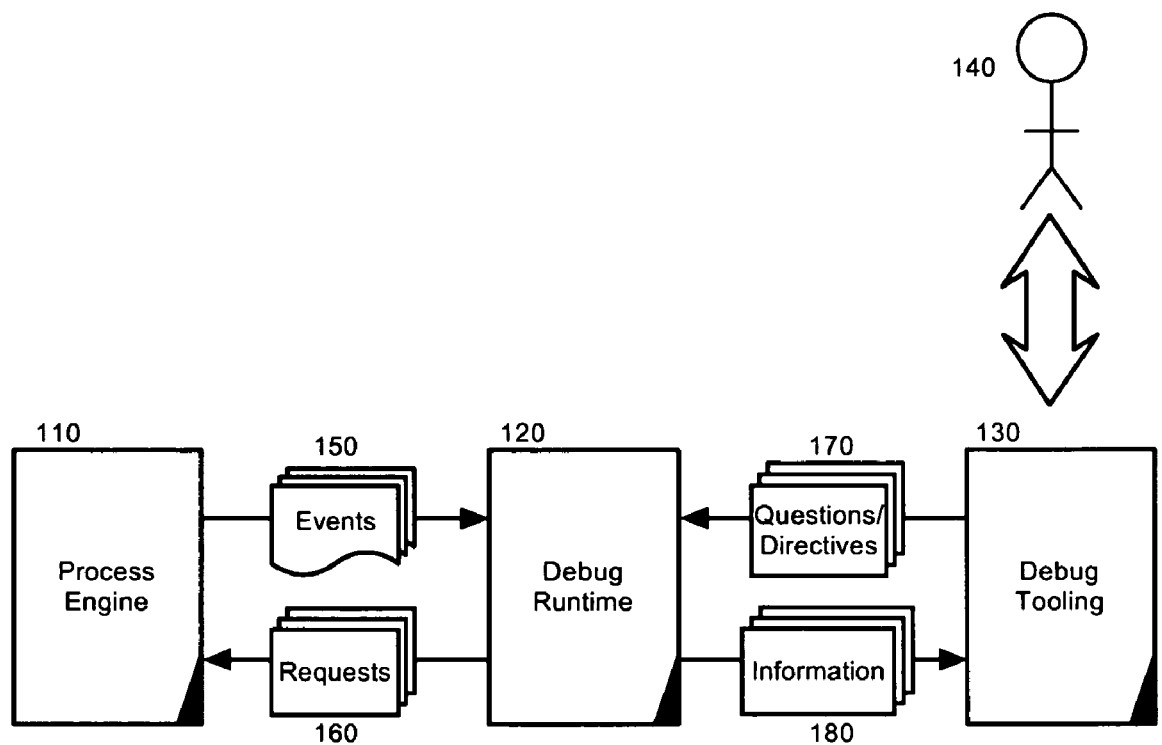
FIG. 1 is a schematic illustration of a debug system for business process programs which has been configured in accordance with the present invention.

In more particular illustration of the inventive embodiments, FIG. 1 is a schematic illustration of a debug system for business process programs. The system can include a process engine 110 configured for managing the processing of a business program by invoking different activities specified by a workflow document describing the activities and links of the business process program. A debug runtime 120 can be communicatively coupled to the process engine 110 and can receive workflow processing events 150 from the process engine 110 as the process engine 110 evaluates the workflow document. Optionally, the debug runtime 120 can issue requests 160 for additional information to the process engine 110 so that the debug runtime 120 can generate a directed graph of the execution of the business process program.

Specifically, before and after each activity or link to an activity is evaluated in the process engine 110, the process engine 110 can forward information regarding the activity or link in the form of an event 150 to the debug runtime 120. The information can include the process instance affected by the event 150, the type of event 150 which has occurred, and the details regarding the event 150. Using the information in the event 150, the debug runtime 120 can determine which activities are related to one another in a single virtual thread of execution and which activities are related to one another in other virtual threads of execution. The determinations of the debug runtime 120 can be used to generate a directed graph of the different activities and links of the business process program.

The debug runtime 120 can be communicatively coupled to a debug tooling 130. The debug tooling 130 can provide logic for performing one or more debug operations upon the business process program including breakpoint establishment and enforcement, step over debugging and the like. In this regard, the debug tooling 130 can provide a user interface through which an end user 140 can access the debug operations of the debug tooling 130. To perform the debug operations, the debug tooling 130 can interact with the debug runtime 120 to access the information 180 in the directed graph for the business process program based upon questions/directives 170 provided to the debug runtime 120.

Figure 2:
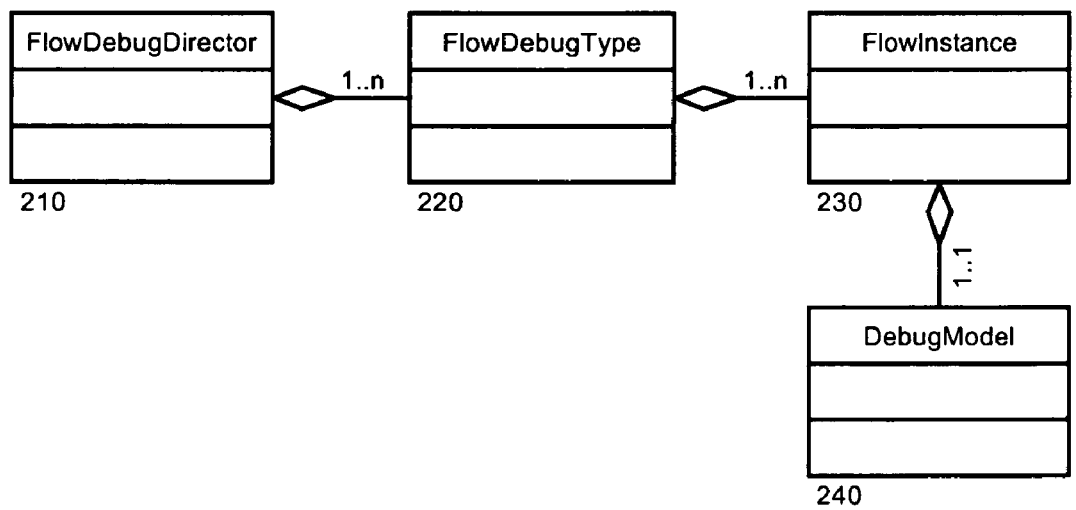
FIG. 2 is an object diagram of the system of FIG. 1.

Once the debug runtime 120 becomes aware of a running business process program, the debug runtime 120 can ensure that a record system is generated to record information regarding the various levels of the process. An exemplary record system can be specified according to the object diagram of FIG. 2. As shown in FIG. 2, a FlowDebugDirector 210 can be associated with one or more FlowDebugTypes 220 which can be associated with one or more FlowInstances 230 which can be yet further associated with a single DebugModel 240.

More specifically, the FlowDebugDirector 210 can encapsulate information regarding the deployed flows and running processes of the business process program. A FlowDebugType 220, by comparison, can encapsulate information regarding a deployed process template. A FlowInstance 230 can encapsulate information regarding a single running process. Finally, a DebugModel 240 can encapsulate a directed graph that describes the current and past state of a single process. In each of the FlowDebugDirector 210, FlowDebugType 220, FlowInstance 230 and DebugModel 240, suitable methods can be provided for accessing the information encapsulated in the FlowDebugDirector 210, FlowDebugType 220, FlowInstance 230 and DebugModel 240.

Returning now to FIG. 1, in operation, at system startup, the process engine 110 can register itself with the debug runtime 120. This 'handshake' operation can result in the process engine 110 passing a facade object to the debug runtime 120 which can be configured to allow access to the state of the process engine 110. The facade object can route all events 150 to the debug runtime 120 through a centralized logical point. In turn, the process engine 110 can receive an object implementing callbacks which can be invoked whenever an activity or link registers a state change in the process engine 110. Consequently, each time the process engine 110 processes an engine object, the process engine 110 can inform the debug runtime 120 through an event 150 mechanism that an. engine object is about to undergo a state change.

When the debug runtime 120 receives an event 150, the debug runtime 120 can look up a FlowInstance object associated with the business program process running in the process engine 110. The received event 150 then can be passed to the identified FlowInstance object so that the event 150 can be analyzed and recorded in a directed graph structure. More specifically, the FlowInstance object can analyze and record the event 150 by utilizing debug graph logic which, for exemplary purposes only, can be constructed according to a model-view-controller architecture shown in FIG. 3.

Figure 3:
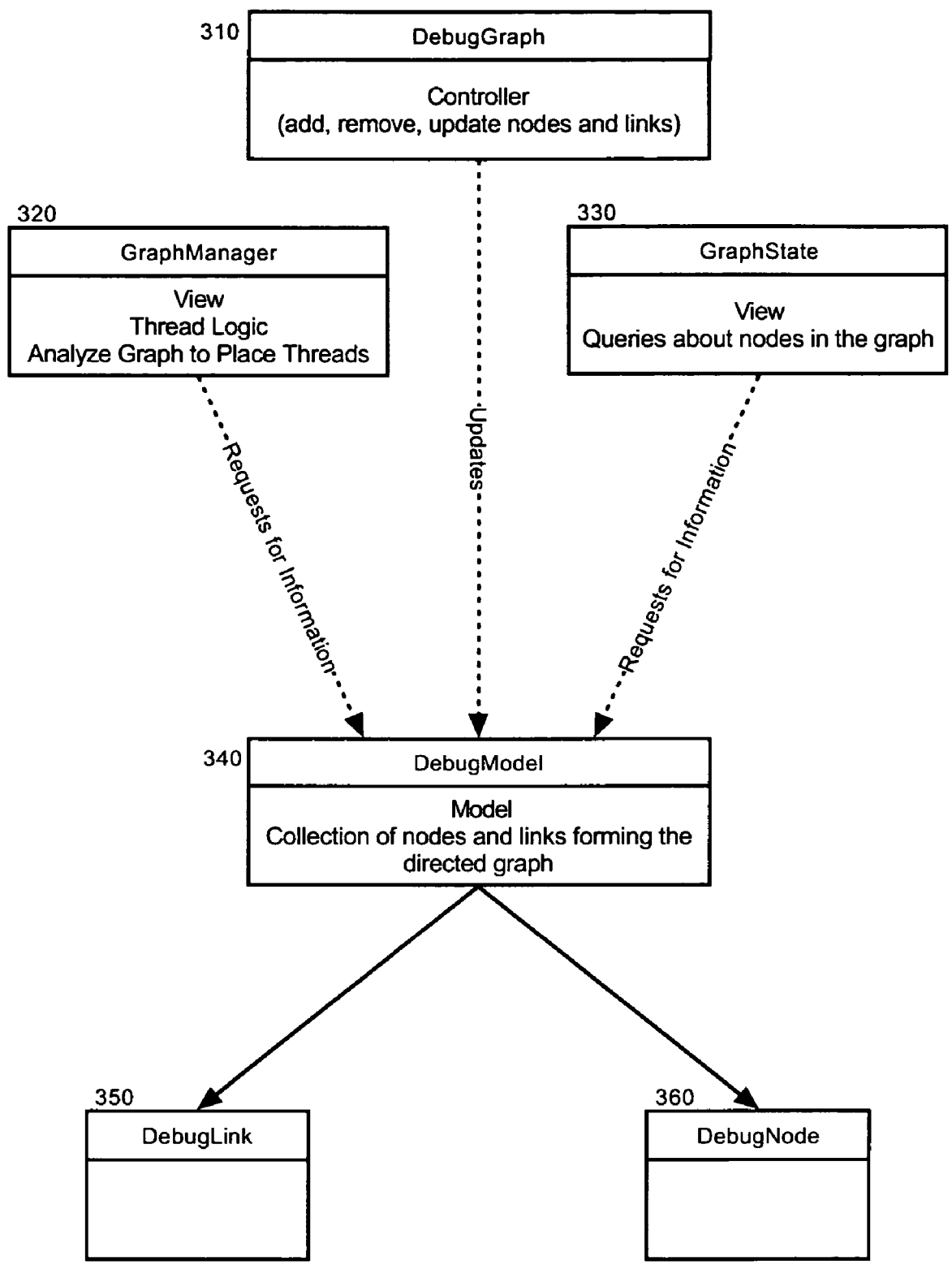
FIG. 3 is an object diagram of a directed graph for use in the system of FIG. 1.

As shown in FIG. 3, a DebugGraph 310 can implement the controller portion of the architecture which can define a methodology for adding, removing and updating nodes and links in the directed graph. The directed graph itself can be encapsulated by the DebugModel 340 which can include both DebugNodes 360 and DebugLinks 350 between nodes in the directed graph. A GraphManager 320 can provide a view of the thread logic represented within the directed graph in the DebugModel 340 while a GraphState 330 can provide a view of the nodes of the directed graph in the Debug Model 340.

As a business process program interacts with a process engine, the directed graph can grow in size generating an ongoing model of the business process program. In particular, as the directed graph grows, the relationships between the activities of the business process program can become apparent. Notably, the debug runtime can classify two nodes in the directed graph as belonging to the same virtual thread if and only if there is a path between the two nodes as specified by one or more links coupling the nodes either directly or indirectly through other nodes. To the extent that two nodes can do not share a path between the nodes, the nodes can be viewed as residing in different virtual threads of execution.

As the directed graph can allow the identification of the execution of one or more virtual threads in a business process program, sophisticated debug operations of conventional procedural and object oriented programming tools can be implemented to the business process program defined by one or more workflow documents. For instance, calls from the process engine to register information with the debug runtime can be synchronous. As such, process engine execution cannot continue on the specified node until the call returns. Consequently, breakpoints can be established by not returning control to the engine until an end user has had an opportunity to inspect and alter the program state before instructing the process engine to continue as the case may be.

Figure 4:
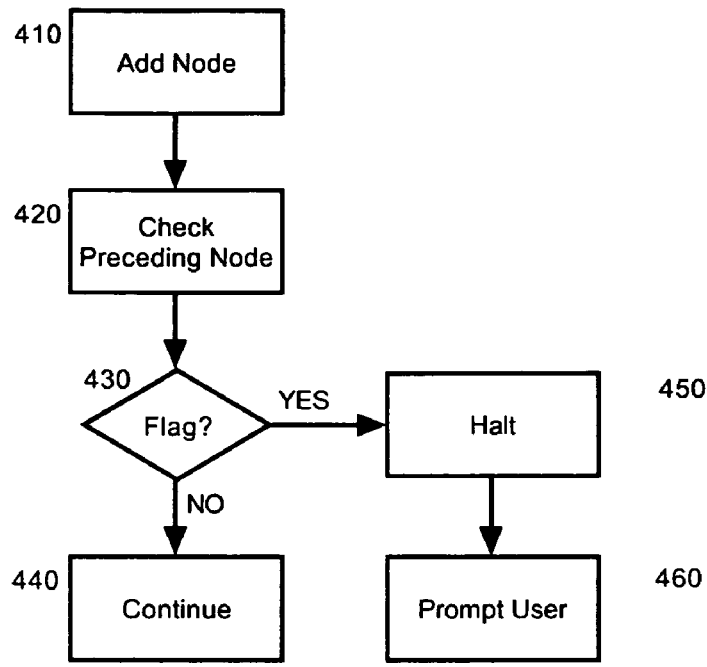
FIG. 4 is a flow chart illustrating a process for managing step over debugging in a directed graph in the system of FIG. 1; and, FIG. 5 is a flow chart illustrating a process for detecting a mixed stack frame in a directed graph in the system of FIG. 1.

More complex debugging operations also can be provided. As an example, FIG. 4 is a flow chart illustrating a process for managing step over debugging in a directed graph in the system of FIG. 1. Beginning in block 410 a node can be added to the directed graph. In block 420, the preceding node in the directed graph can be inspected. If in decision block 420 it is determined that the preceding node has been flagged for step over debugging, in block 450 the execution of the activity of the current node can be halted and the user can be prompted as such in block 460. Otherwise, in block 440 the execution of the node can continue.

Figure 5:
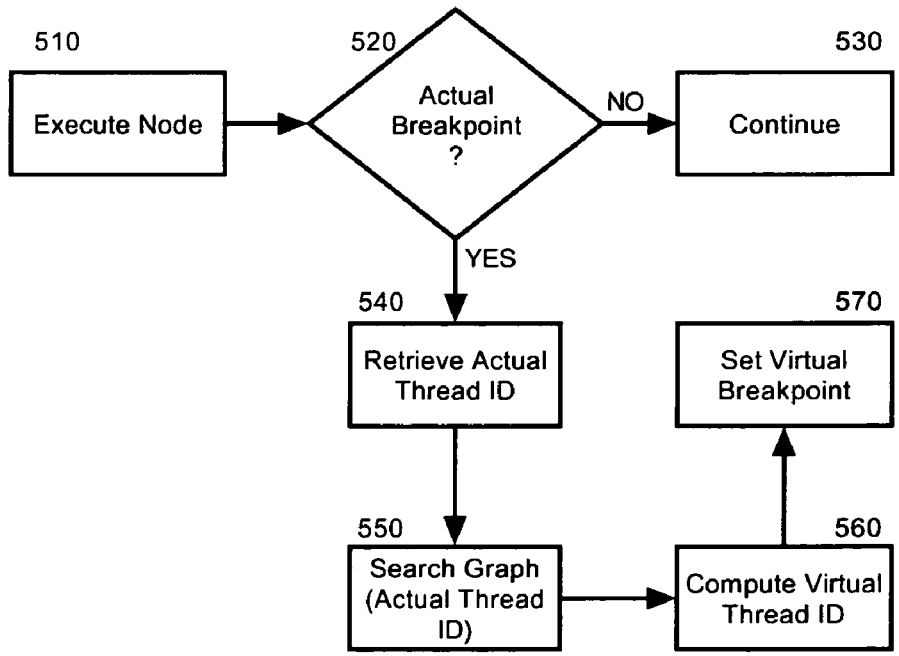

Notably, because workflow languages often invoke other, existing computer programs, the flow of the business process program can become interrupted by the low-level debugging operations of the other, existing computer programs. Accordingly, it can be helpful to provide a mixed call stack leading to the low-level breakpoint. In this regard, FIG. 5 is a flow chart illustrating a process for detecting a mixed stack frame in a directed graph in the system of FIG. 1. Beginning in block 510, the current node can be executed. If in decision block 520 an actual breakpoint is detected, the actual thread identifier can be retrieved in block 540. Otherwise, the execution of the node can continue in block 530.

Utilizing the actual thread identifier, the directed graph can be searched for other nodes sharing the same actual thread identifier in block 550. When a node is located which shares the same actual thread identifier, the matching virtual thread identifier can be computed in block 560 and returned to the end user as though a breakpoint has been enforced in the flow of the virtual thread. Subsequently, in block 570, a marker can be set at the activity or link at the node associated with the actual thread identifier indicating that the user has paused at the specified location in the directed graph in order to maintain the consistency of the virtual thread identifiers.

Finally, the virtual threads of the present invention can be pooled and garbage collected where appropriate so as to emulate the merger of child threads into parent threads. In this regard, whenever the debug runtime halts the execution of a business process program at a specified node, the debug runtime can analyze the directed graph to determine whether a virtual thread identifier already has been assigned to the specified node and whether the virtual thread identifier is available for assignment. If so, the virtual thread identifier can be reused. Otherwise, a new virtual thread identifier can be assigned. In contrast, if more than one virtual thread identifier is available, the debug runtime can use the first located virtual thread identifier and the remaining thread identifiers can be garbage collected thereby providing the appearance of merging threads.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for debugging a business process program comprising the steps of:

for each group of activities in the business process program which are related to each other by way of a link, each activity and link specified in a workflow language common grammar, assigning a unique virtual thread identifier to said group; and, utilizing each assigned unique virtual thread identifier to perform debugging operations on the business process program, the debugging operations comprising setting and enforcing a breakpoint.

2. The method of claim 1, further comprising the step of performing said assigning step synchronously in a business process engine.

3. The method of claim 1, wherein said utilizing step comprises the step of utilizing each assigned unique virtual thread identifier to perform step over debugging.

4. The method of claim 1, wherein said utilizing step comprises the step of utilizing each assigned unique virtual thread identifier to locate a mixed stack frame.

5. The method of claim 1, further comprising the steps of:

generating a directed graph of the business process program based upon different activities linked to selected other activities by way of links; and, performing said debugging operations by utilizing said directed graph.

6. The method of claim 5, wherein said utilizing step comprises the step of utilizing each assigned unique virtual thread identifier to merge virtual threads in said directed graph.

* * * * *

UNITED STATES PATENT AND TRADEMARK OFFICE
CERTIFICATE OF CORRECTION

PATENT NO. : 7,640,538 B2
APPLICATION NO. : 11/099313
DATED : December 29, 2009
INVENTOR(S) : Bennett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Ninth Day of November, 2010

David J. Kappos
*Director of the United States Patent and Trademark Office*